United States Patent
Lavizzari

(10) Patent No.: US 9,146,340 B2
(45) Date of Patent: Sep. 29, 2015

(54) LED LIGHTING DEVICE, IN PARTICULAR CATADIOPTRIC SPOTLIGHT

(71) Applicant: ARTEMIDE S.p.A., Milan (IT)

(72) Inventor: Damiano Lavizzari, Cesano Maderno (IT)

(73) Assignee: ARTEMIDE S.p.A., Milan (IT)

(*) Notice: Subject to any disclaimer, the term of this patent is extended or adjusted under 35 U.S.C. 154(b) by 189 days.

(21) Appl. No.: 13/863,246

(22) Filed: Apr. 15, 2013

(65) Prior Publication Data
US 2013/0301291 A1 Nov. 14, 2013

(30) Foreign Application Priority Data
Apr. 13, 2012 (IT) .............................. MI2012A00605

(51) Int. Cl.
| | |
|---|---|
| G02B 6/42 | (2006.01) |
| F21V 7/04 | (2006.01) |
| F21V 8/00 | (2006.01) |
| F21V 7/00 | (2006.01) |
| F21V 13/04 | (2006.01) |
| G02B 17/08 | (2006.01) |
| G02B 19/00 | (2006.01) |
| F21W 131/304 | (2006.01) |
| F21W 131/405 | (2006.01) |
| F21Y 101/02 | (2006.01) |
| F21Y 103/00 | (2006.01) |
| F21Y 113/00 | (2006.01) |

(52) U.S. Cl.
CPC ............ *G02B 6/0005* (2013.01); *F21V 7/0033* (2013.01); *F21V 7/0091* (2013.01); *F21V 13/04* (2013.01); *G02B 17/08* (2013.01); *G02B 19/0028* (2013.01); *G02B 19/0061* (2013.01); *F21W 2131/304* (2013.01); *F21W 2131/405* (2013.01); *F21Y 2101/02* (2013.01); *F21Y 2103/00* (2013.01); *F21Y 2113/005* (2013.01)

(58) Field of Classification Search
CPC .. G02B 17/08; G02B 6/0005; G02B 19/0028; G02B 19/0061; F21V 7/0033; F21V 7/0041; F21V 7/0091; F21V 13/04; F21Y 2103/00; F21Y 2113/005
USPC .......... 362/299, 300, 302, 555, 558, 560, 231
See application file for complete search history.

(56) References Cited

U.S. PATENT DOCUMENTS

| | | | |
|---|---|---|---|
| 5,278,731 A | 1/1994 | Davenport et al. | |
| 6,350,041 B1 * | 2/2002 | Tarsa et al. .................... | 362/231 |

(Continued)

FOREIGN PATENT DOCUMENTS

| | | |
|---|---|---|
| JP | 2004-014197 A | 1/2004 |
| WO | WO-2011/156645 A1 | 12/2011 |
| WO | WO-2012/036541 A1 | 3/2012 |

OTHER PUBLICATIONS

Search Report issued by the Italian Patent Office in Application No. M20120605 dated Feb. 1, 2013.

*Primary Examiner* — Alan Cariaso
(74) *Attorney, Agent, or Firm* — Venable LLP; Robert Kinberg

(57) ABSTRACT

A LED lighting device extending substantially along an axis and having a LED light source; a light guide located in front of the light source and extending between a proximal end substantially facing the light source, and a distal end opposite the proximal end; and an optical system associated with the light source to direct the luminous flux emitted by the light source; the light guide being shaped so as to generate at the distal end of the light guide an emissive surface equivalent to the real emitting surface of the light source at a predetermined position with respect to the optical system.

13 Claims, 4 Drawing Sheets

(56) References Cited

U.S. PATENT DOCUMENTS

| | | | |
|---|---|---|---|
| 7,083,315 B2 * | 8/2006 | Hansler et al. | 362/559 |
| 8,292,471 B2 * | 10/2012 | Boonekamp et al. | 362/311.02 |
| 8,807,799 B2 * | 8/2014 | Li et al. | 362/299 |
| 2007/0024971 A1 | 2/2007 | Cassarly et al. | |
| 2007/0263383 A1 * | 11/2007 | Ansems et al. | 362/231 |
| 2008/0232084 A1 | 9/2008 | Kon | |
| 2009/0122533 A1 | 5/2009 | Brukilacchio | |

* cited by examiner

LED LIGHTING DEVICE, IN PARTICULAR CATADIOPTRIC SPOTLIGHT

The present invention relates to a LED lighting device, in particular a catadioptric spotlight.

BACKGROUND OF THE INVENTION

As is known, LEDs were initially only used as indicator lights, but are now also being used more widely for room lighting.

Various configurations of LED lighting devices are known.

However, achieving satisfactory light distribution and intensity, especially in applications such as museum lighting, still poses problems.

Known LED lighting devices therefore still leave room for improvement, especially in terms of performance, efficiency and easy manufacture.

SUMMARY OF THE INVENTION

It is an object of the present invention to provide a LED lighting device, in particular a catadioptric spotlight, that is particularly easy to produce and efficient in terms of lighting performance.

According the present invention, there is provided a LED lighting device as defined substantially in the accompanying Claim 1 and, as regards preferred features, in the dependent Claims.

BRIEF DESCRIPTION OF THE DRAWINGS

A number of non-limiting embodiments of the invention will be described by way of example with reference to the attached drawings, in which.

DETAILED DESCRIPTION OF THE INVENTION

Figure 1:
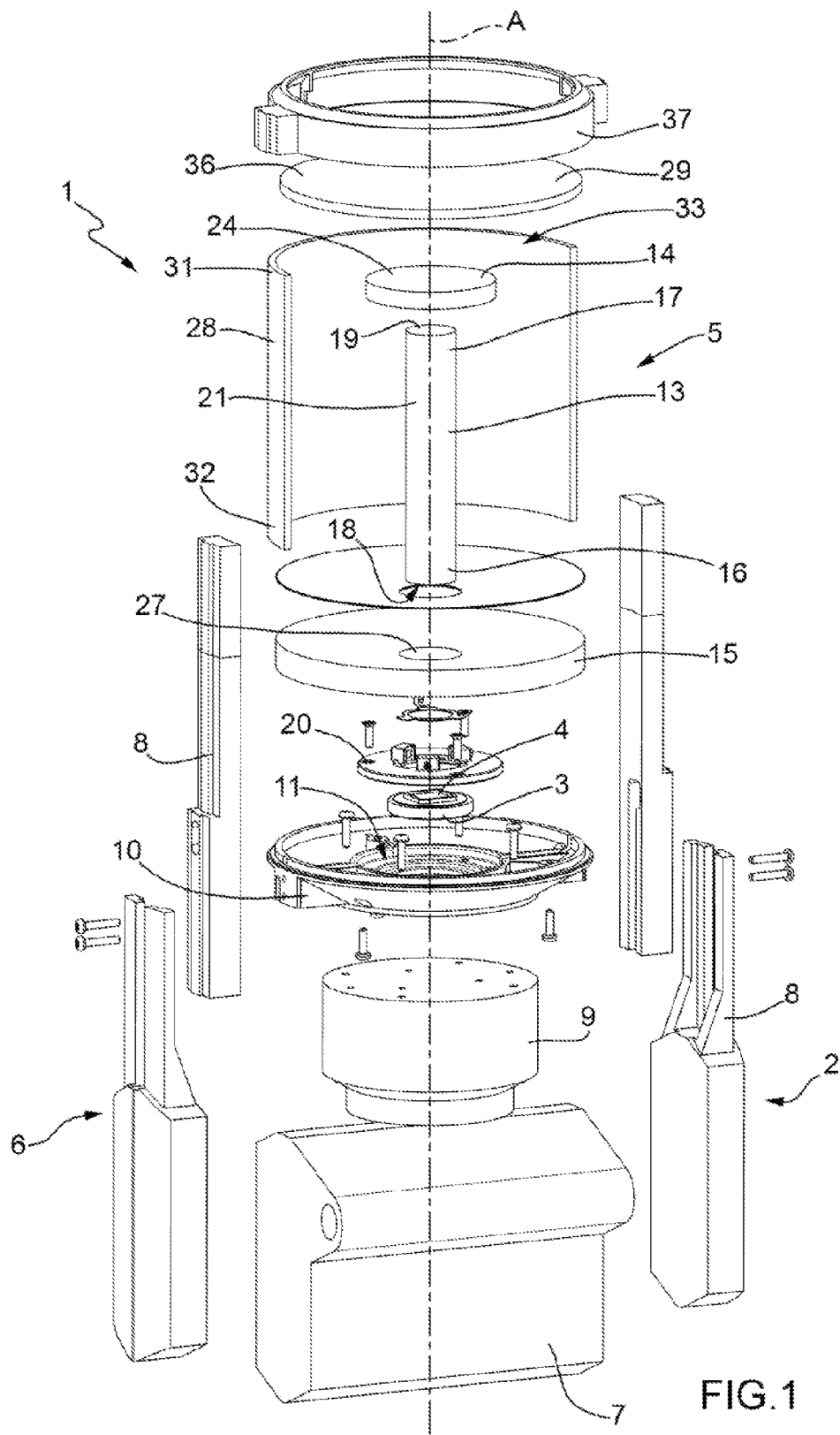
FIG. 1 shows a schematic, partly sectioned, exploded view in perspective of a LED lighting device in accordance with the invention.
Figure 2:
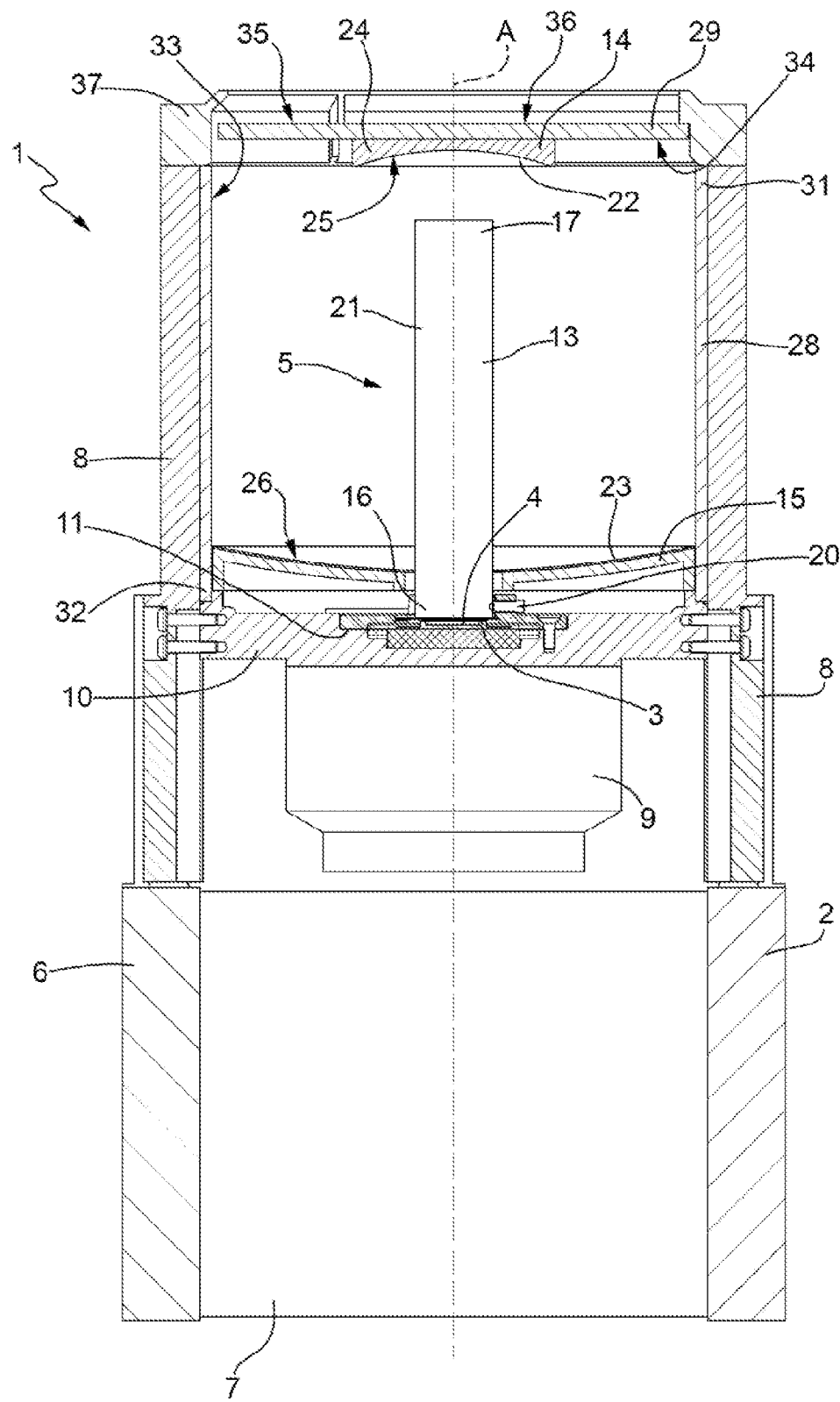
FIG. 2 shows a schematic longitudinal section, with parts removed for clarity, of the FIG. 1 device.

Number 1 in FIGS. 1 and 2 indicates as a whole a LED lighting device, in particular a catadioptric spotlight, which may be used preferably (but not exclusively) for museum lighting.

Device 1 extends along and around an axis A, and comprises a supporting structure 2; a LED light source 3 comprising one or more LEDs 4; and an optical system 5 located along axis A and associated with light source 3 to direct the luminous flux emitted by light source 3.

Though the following description refers to a LED light source 3 with one LED 4, it is understood that more than one LED 4, even with different emission spectra, may be used.

Light source 3 advantageously includes one or more plane LEDs 4 (i.e. LEDs in which the semiconducting material is distributed over a substantially flat surface) having a substantially flat light-emitting surface.

In the example shown (though not necessarily), axis A is a central axis, and also defines an optical axis, of optical system 5.

Supporting structure 2 comprises a fork-shaped body 6 with a base 7, from which project two arms 8 spaced apart laterally and substantially parallel to each other and to axis A. Body 6 supports a heatsink 9 (with an optional cooling fan); and a housing 10 located over heatsink 9 and on which light source 3 is mounted.

Housing 10 has a seat 11 housing light source 3.

Figure 3:
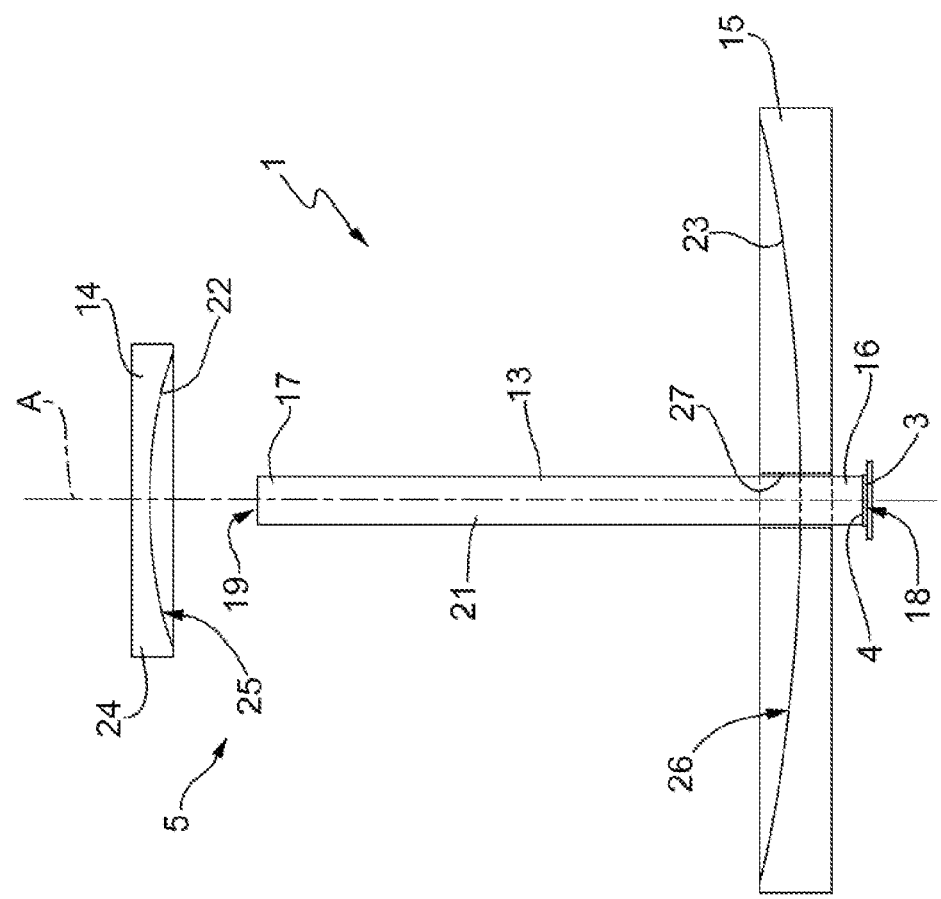
FIG. 3 shows a schematic, not to scale, of a number of component parts of the FIG. 1 device.

With reference also to FIG. 3, optical system 5 comprises a light guide 13, a primary reflector 14, and a secondary reflector 15.

Light guide 13 is located in front of light source 3 and extends along axis A, between a proximal end 16 substantially facing light source 3, and a distal end 17 opposite end 16. Ends 16 and 17 have, respectively, an entry surface 18 and exit surface 19, which, in the example shown (but not necessarily) are substantially parallel to each other and perpendicular to axis A.

Entry surface 18 faces light source 3; and exit surface 19 faces primary reflector 14, which is spaced axially apart from exit surface 19 of end 17.

Light guide 13 is fitted to a support 20 fitted to housing 10.

Light guide 13 is defined by a straight rod 21 of transparent material. Rod 21 may, for example, have a circular or polygonal cross section, which is constant or varies along axis A. In the non-limiting example shown, but not necessarily, rod 21 is cylindrical with a circular base.

Reflectors 14, 15 are positioned facing and spaced apart along axis A, are located substantially at end 17 and opposite end 16 of light guide 13 respectively, and comprise respective opposite concave mirrors 22, 23.

Primary reflector 14 is located at end 17 of light guide 13, and more specifically beyond end 17 along axis A, is positioned facing opposite end 16 and secondary reflector 15, and is spaced axially apart from exit surface 19.

Primary reflector 14 comprises a body 24 made of substantially transparent material and having a reflecting surface 25 facing light guide 13 and defining mirror 22.

Secondary reflector 15 surrounds light guide 13 at end 16, and faces primary reflector 14.

Secondary reflector 15 has a reflecting surface 26 facing light guide 13 and defining mirror 23.

Secondary reflector 15 has an opening 27 through which light guide 13 is inserted.

Light guide 13 is shaped so as to transmit the image of light source 3 along axis A and to internally mix the light emitted by light source 3; and reflectors 14, 15 are shaped and located so that primary reflector 14 virtually reproduces the image of exit surface 19 of light guide 13 substantially at the focus of secondary reflector 15.

More specifically, light guide 13 transmits the image of light source 3 to distal end 17 by a predetermined length L.

In other words, light guide 13 generates, at end 17 of light guide 13, an emissive surface equivalent to the real emissive surface of light source 3; and the equivalent emissive surface is reproduced virtually by primary reflector 14 at the focus of secondary reflector 15.

Device 1 comprises a casing 28 (which may be transparent, opaque or non-transparent) extending along and about axis A and surrounding light guide 13 and reflectors 14, 15; and a transparent cover 29 located along axis A, beyond primary reflector 14.

More specifically, casing 28 has a first longitudinal end 31 surrounding body 24 of primary reflector 14; and a second longitudinal end 32 opposite end 31 and surrounding secondary reflector 15. End 31 is located axially beyond end 17 of light guide 13, and defines a light-emitting opening 33.

Cover 29 is substantially disk-shaped and closes end 31 of casing 28 and opening 33. Cover 29 has a face 34 facing secondary reflector 15 and which receives the light from secondary reflector 15; and an opposite face 35 defining a light-emitting surface 36 of device 1.

Casing 28 and cover 29 are fitted to structure 2, e.g. to arms 8, by a ring nut 37 fixed to arms 8 and surrounding cover 29.

Electric connections and component parts for powering and controlling device 1 are not shown for the sake of simplicity.

In actual use, the light beam emitted by light source 3 enters light guide 13, facing light source 3, through entry surface 18; light guide 13 mixes the light emitted by light source 3 (this is particularly advantageous when the light source comprises LEDs 4 emitting different light, e.g. white LEDs with different colour temperatures and/or LEDs of different colours) and transmits the image of light source 3 to end 17 by length L to generate an emissive surface equivalent to the real emissive surface of light source 3; and the equivalent emissive surface is reproduced virtually by primary reflector 14 at the focus of secondary reflector 15, and is reflected by secondary reflector 15 to light-emitting opening 33.

Optical system 5 may obviously be configured according to the photometric performance required and the need for pre-mixing (in the case of different-coloured LEDs).

For example, the equivalent emissive surface may be smaller than the real emissive surface, so that the equivalent emissive surface reproduced virtually at the focus of primary reflector 14 generates small beam angles.

Figure 4:
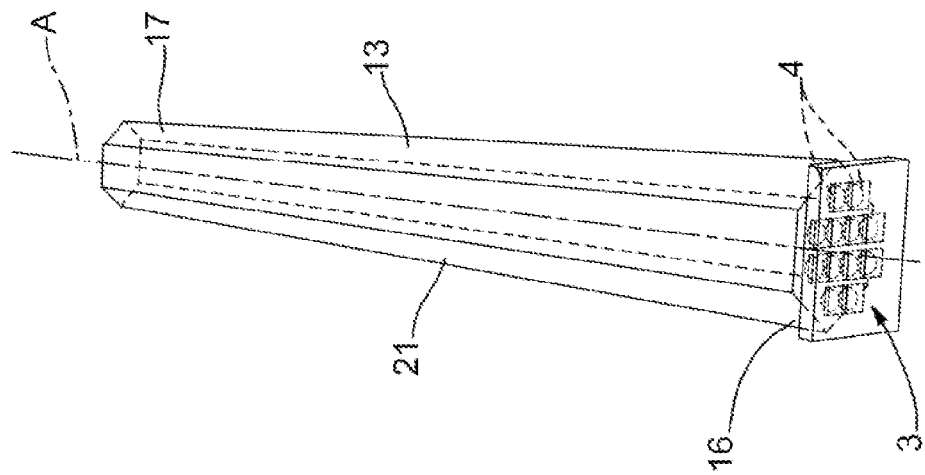
FIG. 4 shows a schematic view in perspective of a number of component parts of a different embodiment of the device according to the invention.

This is done in particular using a light guide 13 tapering towards end 17, as shown in the FIG. 4 embodiment, in which any details similar or identical to those already described are indicated using the same reference numbers.

In this embodiment, the cross section of light guide 13 decreases from proximal end 16 to distal end 17.

In this case, light source 3 comprises a plurality of LEDs 4 of different emission spectra (colours). And, to mix the light emitted by LEDs 4, rod 21 of light guide 13, in addition to varying in cross section along axis A (i.e. tapering towards end 17), also has a polygonal (preferably at least six-sided) cross section.

The focal lengths and apertures of the reflectors are also selected to maximize efficiency, minimize aberration and reduce size.

Figure 5:
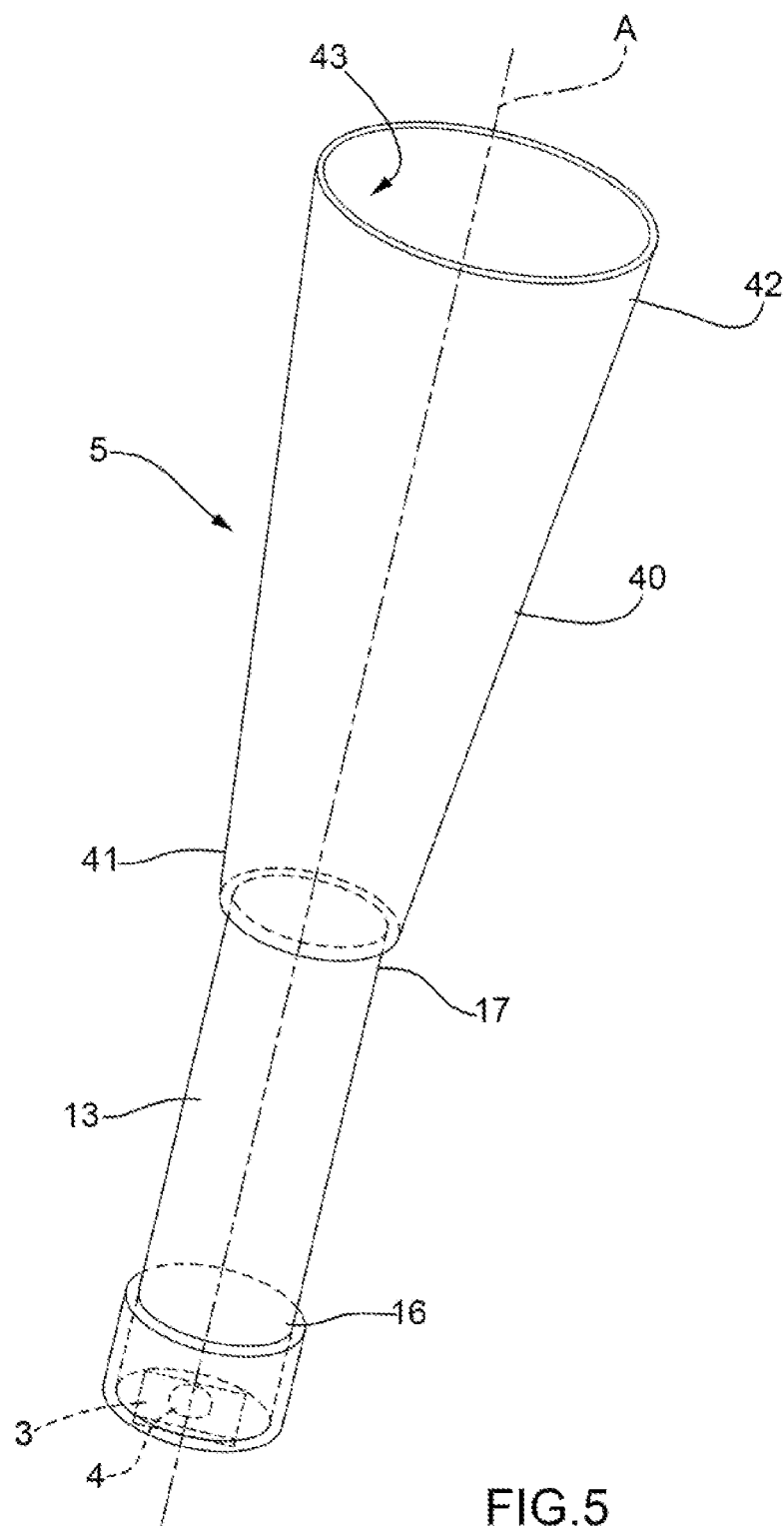
FIG. 5 shows a schematic view in perspective of a number of component parts of a further embodiment of the device according to the invention.

In the FIG. 5 embodiment, optical system 5 comprises light guide 13 facing light source 3; and an optical element 40 located at distal end 17 of light guide 13.

Optical element 40, for example, is a cone reflector, but may be a reflector of different shape or even a different type of optical element (e.g. a lens).

Optical element 40 also extends along and about axis A, and has a first end 41 surrounding distal end 17 of light guide 13; and a second end 42 axially opposite first end 41.

Optical element 40 flares from end 41 to end 42. More specifically, optical element 40 has an optionally faceted inner reflecting surface 43 sloping with respect to axis A and flaring from end 41 to end 42.

In this embodiment, too, which is particularly suitable for generating diverging beams, light source 3 is positioned remotely with respect to optical system 5, and light guide 13 acts as a connector to transmit light from light source 3 to an appropriate position for optical system 5.

In this case, too, using a faceted and/or tapered light guide 13 produces a mixing effect (with a light source 3 with LEDs 4 of different colours).

Clearly, changes may be made to the lighting device as described and illustrated herein without, however, departing from the scope of the accompanying Claims.

The invention claimed is:

1. A LED lighting device extending substantially along an axis (A) and comprising a LED light source; a light guide located in front of the light source and extending between a proximal end substantially facing the light source, and a distal end opposite the proximal end; and an optical system associated with the light source to direct the luminous flux emitted by the light source, wherein the optical system comprises a primary reflector located at the distal end of the light guide and a secondary reflector located substantially at the proximal end of the light guide; the light guide being shaped to internally mix the light emitted by the light source, and to generate at the distal end of the light guide an emissive surface equivalent to the real emissive surface of the light source at a predetermined position with respect to the optical system, and the reflectors being shaped and located so that the primary reflector virtually reproduces the equivalent emissive surface substantially at the focus of the secondary reflector.

2. A device as claimed in claim 1, wherein the secondary reflector substantially surrounds the light guide.

3. A device as claimed in claim 1, wherein the reflectors comprise respective opposite, facing concave mirrors.

4. A device as claimed in claim 1, wherein the primary reflector comprises a body made of substantially transparent material and having a reflecting surface facing the light guide.

5. A device as claimed in claim 1, wherein the distal end of the light guide has an exit surface, and the primary reflector is spaced axially apart from the distal end of the light guide and from the exit surface.

6. A device as claimed in claim 5, wherein the exit surface is substantially perpendicular to the axis (A).

7. A device as claimed in claim 1, wherein the secondary reflector is located at the proximal end of the light guide.

8. A device as claimed in claim 1, wherein the light guide comprises a straight rod made of transparent material and extending along the axis (A).

9. A device as claimed in claim 1, and comprising a transparent casing extending along and about the axis (A) and surrounding the light guide and the reflectors.

10. A device as claimed in claim 1, and comprising a transparent cover located along the axis (A), beyond the primary reflector, and having a face facing the secondary reflector and which receives the light from the secondary reflector; and an opposite face defining a light-emitting surface of the device.

11. A device as claimed in claim 1, wherein the light guide tapers towards the distal end.

12. A device as claimed in claim 1, wherein the light guide has a polygonal cross section.

13. A device as claimed in claim 1, wherein the light source comprises a plurality of LEDs of different emission spectra and/or colours.

* * * * *